US007523506B1

(12) United States Patent
Kumar et al.

(10) Patent No.: US 7,523,506 B1
(45) Date of Patent: Apr. 21, 2009

(54) APPROACH FOR MANAGING FUNCTIONALITIES WITHIN A SYSTEM

(75) Inventors: Subramanya Kumar, Louisville, CO (US); Brandon E. Taylor, Longmont, CO (US); Jeffrey W. Allen, Denver, CO (US); Anshuman Mishra, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 841 days.

(21) Appl. No.: 11/095,807

(22) Filed: Mar. 30, 2005

(51) Int. Cl.
G06F 17/30 (2006.01)
(52) U.S. Cl. .................................. 726/27; 726/2; 726/26
(58) Field of Classification Search .................. 726/27, 726/26, 2
See application file for complete search history.

(56) References Cited

OTHER PUBLICATIONS

Year 2001, http://www.wohl.com/On_Demand_Chart.htm.*
Year 2001, http://www.wohl.com/wa03-90.htm.*
Printed out in year 2008, Computerworld, Deployment Use Case Analysis for Data Center Management Toos, Subramanya Kumar and Brandon Taylor.*
Printed out in year 2008, Sun Dynamic Infrastructure Suite of Services, Sun Microsystems.*
Printed out in year 2008,Migrate from Sun, IBM.*
Printed out in year 2008, IBM Systems, IBM Director Systems Management Guide, IBM.*
Printed out in year 2008, IBM Dynamic Infrastructure for mySAP Business Suite Operation and Administration, IBM.*
Printed out in year 2008, Virtualizing and Optimizing with the Sun N1 Advanced Architecture for SAP Solutions, Sun Microsystems.*
Printed out in year 2008, Datasheet for Sun Dynamic Infrastructure Suite of Services, Sun Microsystems.*
Printed out in year 2008, IBM Virtualization Engine, IBM Dynamic Infrastructure Enterprise Edition for mySAP Suite for Linux for xSeries Installation and Operation, IBM.*
Printed out in year 2008, IBM Systems IBM Virtualization Manager, IBM.*
Printed out in year 2008, IBM Dynamic Infrastructure for mySAP Suite Planning, IBM.*
A network management proxy agent development for the Defense Information Systems Agency (DISA) IP router-based networks using the Web technology; Boyle, J.; Nour, N.; Truong, H.; MILCOM 97 Proceedings vol. 3, Nov. 2-5, 1997 pp. 1251-1254 vol. 3.*

(Continued)

*Primary Examiner*—David Y Jung
(74) *Attorney, Agent, or Firm*—Hickman Palermo Truong & Becker LLP

(57) ABSTRACT

An approach for managing functionalities within a system generally involves the use of indicators, such as privileges, that are associated with the functionalities. Each functionality is associated with an indicator that is used to determine whether the associated functionality is available for use by an end user. A determination is made that one or more particular functionalities are to be associated with the response because the particular indicator is included in the set of indicators and corresponds to the one or more functionalities. If the system includes functionalities for which indicators are not included in the set of indicators, those functionalities are not reflected in the response. The response is sent so that information regarding the one or more particular functionalities can be displayed via a user interface. In some implementations, an access control mechanism can use privileges for determining functionality availability and privileges for determining user access.

30 Claims, 4 Drawing Sheets

OTHER PUBLICATIONS

Smiley—an interactive tool for monitoring inter-module function calls Goldman, N.M.; Program Comprehension, 2000. Proceedings. IWPC 2000. 8th International Workshop on Jun. 10-11, 2000 pp. 109-118.*

A database evolution approach for object-oriented databases Rashid, A.; Software Maintenance, 2001. Proceedings. IEEE International Conference on Nov. 7-9, 2001 pp. 561-564.*

* cited by examiner

APPROACH FOR MANAGING FUNCTIONALITIES WITHIN A SYSTEM

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Software applications are often large and complicated, and after creating a new application, the software producers continue to make modifications, improvements, and add new features to the application. As a result, applications that are typically installed at a large number of customer locations periodically need to be upgraded to include such changes. The upgrading of an installed application in the field at a customer location generally involves taking down the current installation of the application, performing the upgrade to the application in the form of making modifications to one or more features of the current software installation or installing one or more new features, and then bringing back up the upgraded application for subsequent use by the customer.

However, there are several drawbacks with this approach to upgrading applications. For example, the installed software is unavailable for use while the upgrade is being performed, which is referred to as "downtime." Often the downtime for performing an upgrade is sufficiently long that special arrangements must be made by the customer so that making the upgrade does not adversely impact the customer's normal business operations that involve the use of the application being upgraded.

As another example, whenever an application is taken down, there is a risk that the application will not be returned for use on time or that the application will work properly after the upgrade is performed. The larger the software application and the greater the number of changes being made as part of an upgrade, the more fragile the application and therefore greater the risk that the application will not be returned to operation on time and that there will not be subsequent problems arising from the upgrade. Sometimes the risk of problems arising from making an upgrade is sufficiently great to cause a customer to delay or even forgo the upgrade to avoid the risk of an unacceptable interruption in the customer's normal business operations.

As yet another example of the problems with making application upgrades, upon completion of a successful upgrade, the new features that have been added via the upgrade to the application are often poorly integrated or not integrated at all with existing features of the application. The lack of integration is intended to reduce downtime and minimize risk by limiting the scope and complexity of the upgrade. For example, if the upgrade includes adding a new feature, the newly added functions for the new feature typically can only be used by themselves as part of the new standalone feature. However, customers often want to be able to use newly added features with preexisting features, and the lack of integration between new and preexisting features limits the usefulness of the new features.

In order to use new features with other preexisting features of the software application, modifications to those preexisting features would be required, which increases the complexity of the upgrade with an associated increase in downtime and risk. For example, a preexisting feature would need to be modified to work with the newly added feature as part of the upgrade to the software application to allow the preexisting feature to incorporate the new functions from the newly added feature.

While modifying one preexisting feature to work with one newly added feature is usually not a significant problem, software applications typically include dozens or hundreds of features. As a result, upgrades typically involve adding a significant number of new features that customers would like to have integrated with each other and the preexisting features. Due to the exponential increase in the complexity of the upgrade that would be involved in integrating all new features with the preexisting features, upgrades often allow newly added features to be used in a stand-alone fashion or with very limited integration with the preexisting features.

Another problem with using limited upgrades for application is that, from the user's perspective, the upgraded application suffers from a problem known as the "silo effect" because the newly added features can only be used separately from other preexisting features. Even if the upgrade does attempt to incorporate some integration of new features with an preexisting features, the integration is typically very limited and as a result, the customer can easily see that the new features were newly added as part of an incremental upgrade because the new features are not well integrated with the preexisting features. This result tends to lesson the customer's perceived value of undertaking the upgrade and reduces the customer's willingness to incur the associated downtime and risk of making the upgrade.

SUMMARY

An approach for managing functionalities within a system generally involves the use of indicators that are associated with the functionalities and using the privileges to determine which functionalities are available in formulating a response to a request. In one embodiment, a request is received for which a response involves providing information regarding the functionalities that are available to be used. In response to receiving the request, data is accessed that describes a set of indicators that corresponds to a set of functionalities that are included in the system. Each functionality of the set of functionalities is associated with an indicator in the set of indicators and each indicator can be used to determine whether the associated functionality is available for use.

Also in response to the request and based on the data including a particular indicator in the set of indicators, a determination is made that one or more particular functionalities in the set of functionalities are to be associated with the response because the particular indicator corresponds to the one or more functionalities. In response to the request, the response is sent so that the information regarding the one or more particular functionalities can be displayed via a user interface.

In some implementations, the set of indicators is a set of privileges. For example, the privileges can be part of an access control mechanism, such as with role based access control. Typically, the access control mechanism uses privileges for determining which users are permitted to access which resources of a system, and in these implementations, the set of privileges is expanded to include additional privileges for determining which functionalities and features are available for use. Thus, the same access control mechanism incorporates both the privileges for determining functionality availability and the privileges for determining user access. Both types of privileges can be used together to determine whether a particular functionality is available for use by a particular user.

The approach for managing functionalities can be incorporated into an approach for updating software that includes functionalities that are tightly integrated with each other as part of a system so that functionalities are able to work in conjunction with each other. In one embodiment, a first version of the software is created that includes a set of functionalities that includes a particular functionality that can be used both alone and in conjunction with one or more other functionalities. The first version of the software is installed for a customer, and the first version includes a set of security privileges that are associated with a set of functionalities. Each functionality in the set of functionalities is associated with a security privilege in the set of security privileges, and based on the set of security privileges, the customer is able to use the functionalities that are associated with the set of security privileges.

Without changing the first version of the software, the set of security privileges is modified to include a new security privilege. As a result, the customer can now use the functionality that corresponds to the new security privilege, either alone or in combination with other privileges, which is in contrast to the situation before the set of security privileges was modified to include the new privilege in which the associated functionality could not be used by the customer.

According to other aspects, the invention encompasses a machine-readable medium, a carrier wave, an apparatus, and a system configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

Figure 1:
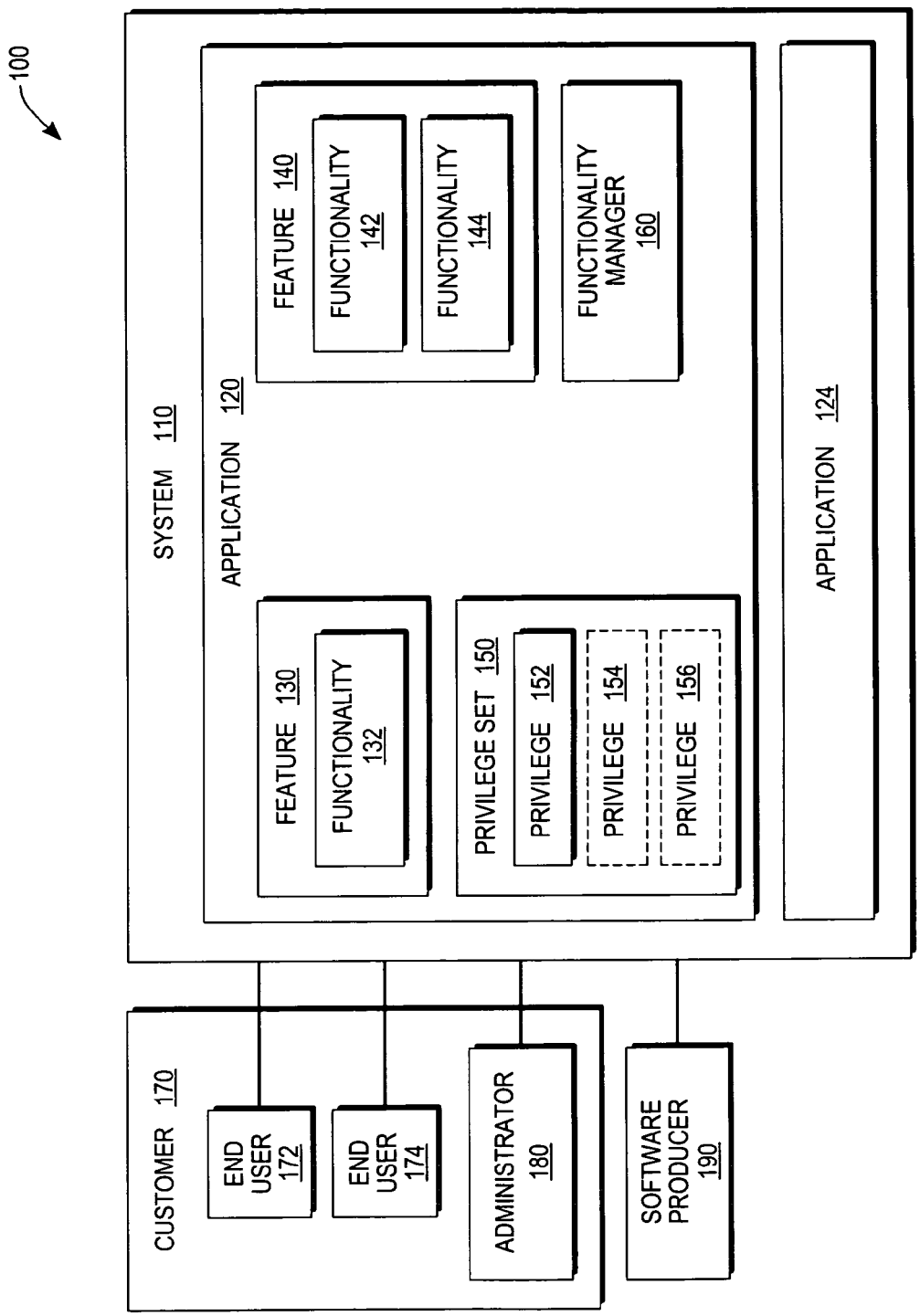
FIG. 1 is a block diagram that depicts a high level overview of a system for managing functionalities, according to an embodiment.

A method and apparatus for managing functionalities in a system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

1.0. OVERVIEW
 1.1 Definitions—Feature, Functionality, Indicator, Privilege, Available
 1.2 Structural Overview
 1.3 Functional Overview
2.0 ASSOCIATING PRIVILEGES WITH FUNCTIONALITIES
 2.1 Establishing a Set of Privileges for an Application
 2.2 Mapping Privileges to Functionalities
 2.3 Working With a Set of Privileges
 2.4 Configuring a Set of Privileges
 2.5 Positive and Negative Privileges
3.0 USING PRIVILEGES TO MANAGE FUNCTIONALITIES
 3.1 Associating Privileges with Application Responses
 3.2 Accessing a Set of Privileges
 3.3 Determining Which Functionalities to Associate With a Response
 3.4 Generating and Sending a Response
 3.5 Displaying Responses via User Interfaces
4.0 FUNCTIONALITY STATES AND STATE TRANSITIONS
 4.1 States of Functionalities
 4.2 Transitioning from One Functionality State to Another
5.0 TIGHTLY INTEGRATED SOFTWARE APPLICATIONS
 5.1 "Forklift" Upgrades
 5.2 Minimizing or Avoiding Incremental Upgrades
6.0 USING PRIVILEGES WITH OTHER APPLICATION FEATURES
 6.1 Role Based Access Control
 6.2 Dynamic Content Generation
7.0 HARDWARE OVERVIEW
8.0 EXTENSIONS AND ALTERNATIVES 1.0 Overview Techniques are provided for managing functionalities in a system. For example, the system can include a software application that is stored on one or more servers and that can interact with one or more other servers. Such an application is typically produced by a software producer and installed at a number of customer locations, although the techniques herein are not limited to those specific implementations. The application generally includes a number of features, each of which includes one or more functionalities that can be used by the end users that are associated with the customer.

When a particular version of the application is first installed at the customer, the application can include a large number of features and functionalities, but the software producer may not want all of the features and functionalities to be made immediately available for use by the customer and the end users associated with the customer. For example, the software producer may have a basic set of features that are included in a base price for the software, and additional features or sets of features are made available to the customer for additional compensation. The additional costs, which may be paid by the customer as part of the initial installation or later when the customer decides that some functions not originally purchased are then desired. The software producer wants to include all the functions when developing the particular version of the application, so that if and when the customer later decides to purchase any additional features, the functions associated with the additional features are fully integrated with the other functions of the other features of the application and therefore can be used together, when appropriate. The techniques described herein are directed to an approach for managing those functions that are associated with the application's features so that particular functions can be activated or deactivated without the need for changing the particular version of the software that has been installed on disk for a customer.

1.1 Definitions—Feature, Functionality, Indicator, Privilege, Available

This section provides definitions of certain terms that are used herein to describe the approaches for managing functionalities of a system and in the claims.

For purposes of explanation, an example is used that includes a power management feature and three power management functions, namely a "power on" function, a "power off" function, and a "power cycle" function. The "power on" function means that the power state of a device is changed from "off" to "on," such as by remotely terminating the power being supplied to the device. The "power off" function means that the power state of a device is changed from "on" to "off," such as by remotely providing power to the device. The "power cycle" function means that the power state is changed from one state to another state and then back to the original state (e.g., from "off" to "on" and then back again to "off" or vice versa).

As used herein, the term "feature" refers to one or more functions. Generally, the functions are related in some sense to each other, although that is not always required. As described above, a system may include a power management feature that includes one or more power management functions, such as the particular power management functions described above.

As used herein, the term "functionality" means a function or capability. For example, in the example of the power management feature, there is a power on functionality, a power off functionality, and a power cycle functionality that allows a device to be turned on, turned off, or power cycled from on to off to one or vice versa.

As used herein, the term "indicator" is a logical construct that is used to designate the status of an associated item. For example, a power state indicator can be used to designate the power state of a device, such as whether the device is "off" or "on." As another example, a functionality indicator can be used to designate whether the functionality is available for use or not available for use.

As used herein, the term "privilege" refers to a type of indicator that is used to designate whether access to an item is permitted or not permitted. For example, a security privilege is a type of privilege that determines whether users of a system have been granted access to the system or whether a user's access to the system has been revoked. As another example, a privilege for a functionality can be used to designate whether the associated functionality is available for use by end users of the system or whether the associated functionality is not available for use by end users.

As used herein, the term "available" means that a functionality is designated to be free for use by one or more end users, whereas the terms "not available" or "unavailable" indicate that a functionality is not designated as being free for use by one or more end users.

For purposes of explanation, the examples herein are described in terms of privileges, which as described above, are examples of indicators. However, the techniques described herein are not limited to privileges, little less security privileges, and any type of indicator may be used that is capable of being used to determine whether a functionality is available for use or not available for use.

1.2 Structural Overview

FIG. 1 is a block diagram that depicts a high level overview 100 of a system 110 for managing functionalities, according to an embodiment. FIG. 1 depicts a system 110 that includes an application 120 and an application 124. For simplicity, system 110 only includes two applications and the details of application 124 are omitted. But in general, system 110 can include any number of applications and application 124 can include any number of features and functionalities as described herein with respect to application 120. Finally, for purposes of explanation, only a limited number of features, functionalities, and privileges are depicted in FIG. 1 and described herein, although in generally any number of features, functionalities, and privileges can be used in a particular implementation.

Application 120 includes feature 130 that in turn includes functionality 132. Application 120 also includes feature 140 that in turn includes functionalities 142, 144. In addition, application 120 includes privilege set 150 that in turn includes privileges 152, 154, 156. Note that privileges 154, 156 are depicted by dashed boxes, not solid boxes, to denote that privileges 154, 156 may or may not be included in privilege set 150, as described further herein.

Finally, application 120 includes functionality manager 160 that uses privilege set 150 to determine whether the functionalities of features 130, 140 are available for use by end users 172, 174 and administrator 180. For simplicity, functionality manager 160 is depicted in FIG. 1 as being part of application 120, but in general the capabilities of functionality manager 160 can be implemented in any of a number of ways. For example, the capabilities of functionality manager 160 can be implemented in another application, such as application 124, that is separate from application 120, or even in another application that is not part of system 110. As another example, the capabilities of functionality manager 160 can be incorporated into another portion of application 120, such as a security manager (see the discussion of role based access control below), or one or more modules or components of application 120 can be designed to perform one or more functions of functionality manager 160.

For purposes of explanation, privilege 152 is associated with functionality 132 and privileges 154, 156 are associated with functionalities 142, 144, respectively.

In addition to system 110, FIG. 1 depicts a customer 170 that includes end users 172, 174 that can interact with system 110, along with an administrator 180. FIG. 1 also depicts a software producer 190 that also can interact with system 110 but that is separate from customer 170. Generally, software producer 190 is the creator of application 120 and perhaps also of application 124 and sells applications 120, 124 to one or more companies, such as customer 170. However, in other implementations, software producer 190 can be part of customer 170, which may be the case in situations involving large companies that produce their own software for internal use as well as perhaps for external use by others.

When application 120 is first installed in system 110 at a customer location, application 120 includes both features 130, 140. However, upon initial installation, assume that the customer has only paid for feature 130, and software producer 190 desires to only allow the customer's end users 172, 174 and the customer's administrator 180 to be able to see and use feature 130 and not to be able to use or even see feature 140.

As a result, upon completion of the initial installation of application 120, privilege set 150 only includes privilege 152.

Following the installation of application 120 in system 110, administrator 180 can determine which functionalities can be used by which end users. For example, administrator can set privilege 152 to be available to allow any end user, including end users 172, 174, to use functionality 132. When end users 172, 174 access application 120, functionality manager 160 uses privilege set 150 to determine which functions are available for use. Because privilege set 150 only includes privilege 152, functionality manager 160 determines that only functionality 132 of feature 130 is available for use by end users 172, 174.

As another example, administrator 180 can configure privilege 152 to be available and then use a typical role based access control approach to permit end user 172 to use functionality 132 while denying end user 174 the ability to use functionality 132. As a result, while functionality manager 160 determines that functionality 132 is available for use by both end users 172, 174, a role based access control manager (not shown) determines that only end user 172 is permitted access to functionality 132, and therefore end user 174 is denied access to functionality 132. In some implementations, a single privilege manager can perform the functions performed by functionality manager 160 and the access control manager, particularly in implementations in which security privileges are used as the indicators for determining the availability of the corresponding functionalities.

After initial installation of application 120, assume that the customer decides to purchase feature 140. Software producer 190 securely accesses application 120 to add privileges 154, 156 to privilege set 150. Thereafter, administrator 180 can configure privileges 154, 156 to be available for use by end users. Similarly, administrator 180 can configure any of privileges 152, 154, 156 to not be available for use by one, some, or all end users. Then depending on whether a particular privilege is configured for use by a particular end user, functionality manager 160 determines whether the associated functionalities are available for use by the particular end user.

1.3 Functional Overview

Figure 2:
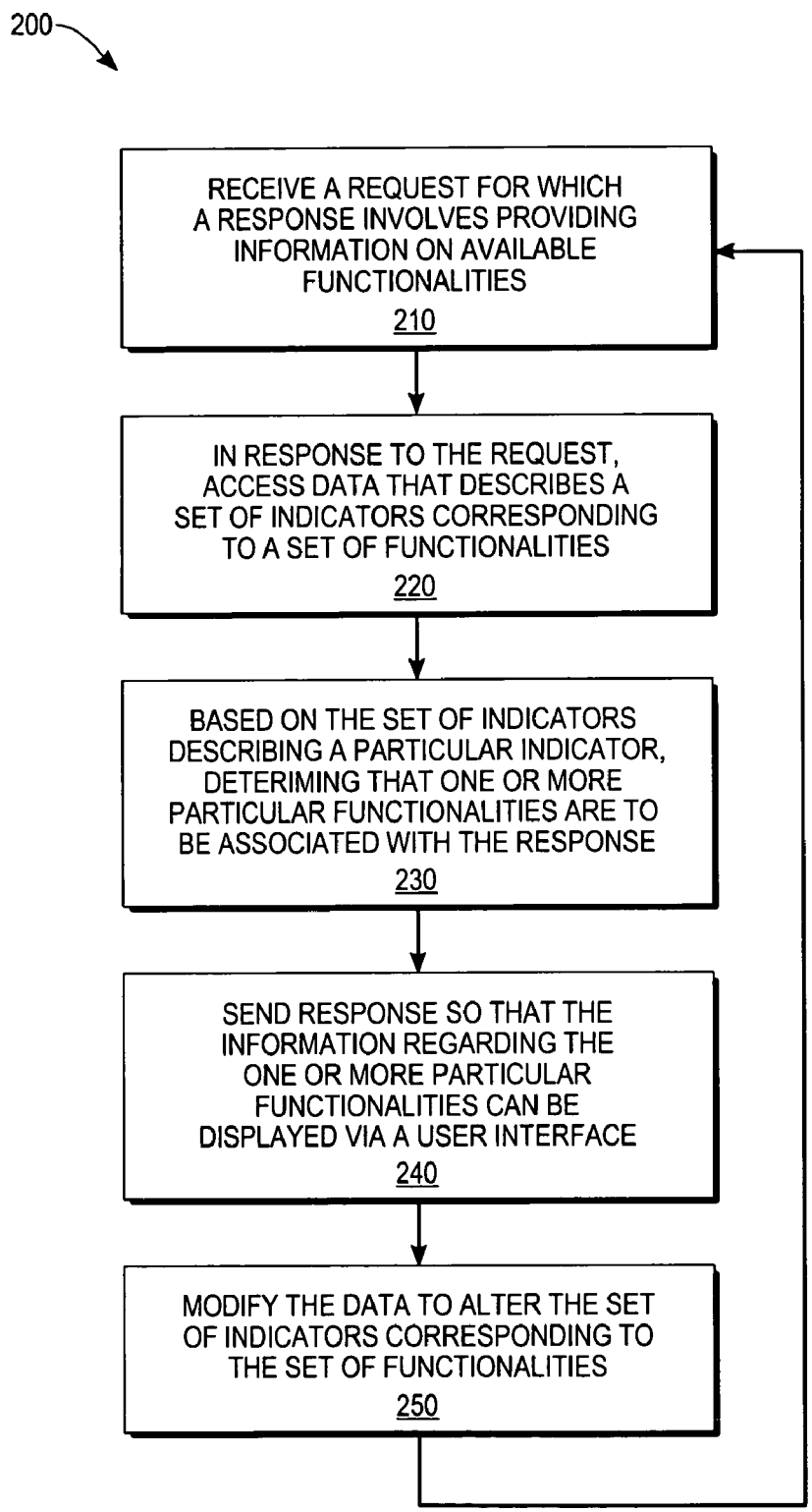
FIG. 2 is a flow diagram that depicts a high level overview of an approach for managing functionalities in a system, according to an embodiment.

FIG. 2 is a flow diagram that depicts a high level overview 200 of an approach for managing functionalities in a system, according to an embodiment. For purposes of explanation, FIG. 2 is described with reference to system 110 and the other elements depicted in FIG. 1. However, the approach of FIG. 2 applies to any system and entities that interact with a system, not just system 110 and the other elements of FIG. 1. In describing FIG. 2 with reference to FIG. 1, privilege set 150 initially includes only privilege 152, although later in the example, privilege set 150 is modified to include privileges 154, 156.

In block 210, application 120 receives a request from end user 172 for which a response involves providing information on available functionalities. For example, assume that end user 172 wants to access an operating system (OS) deployment feature of application 120, and through a user interface, end user 172 selects an "OS Deployment" option from a list of available options. The OS deployment feature corresponds to feature 130 and functionality 132 corresponds to an OS deployment function. Note that the OS deployment feature may include other functionalities not illustrated in FIG. 1. The response to the request from end user 172 involves providing information about the OS deployment functionalities that are currently available for application 120, which in this simplified example corresponds to just functionality 132.

In block 220, in response to the request, application 120 accesses data that describes a set of indicators that correspond to a set of functionalities. For example, functionality manager 160 of application 120 accesses privilege set 150 that includes privilege 152 that corresponds to functionality 132.

In block 230, based on the set of indicators describing a particular indicator, application 120 determines that one or more particular functionalities are to be associated with the response to the request. For example, functionality manager 160 determines based on privilege set 150 including privilege 152 that a particular functionality, namely functionality 132, is to be associated with the response to the request. However, because initially privilege set 150 only includes privilege 152 and not privileges 154, 156, functionality manager 160 does not determine that privileges 154, 156 are to be associated with the response. As a result, even though application 120 includes feature 140 with the associated functionalities 142, 144, the user cannot access and in fact is likely not even aware that application 120 includes feature 140 and the associated functionalities 142, 144.

In block 240, application 120 sends a response so that the information regarding the one or more particular functionalities can be displayed via a user interface. For example, application 120 sends a response to end user 172 with information that allows end user 172 to select the OS deployment functionality that corresponds to functionality 132, such as by presenting a button object in a browser-based user interface. Thereafter, end user 172 can select to use the OS deployment functionality to deploy the desired OS to one or more devices.

In block 250, software producer 190 modifies the data to alter the set of indicators corresponding to the set of functionalities. For example, software producer 190 securely accesses application 120 to modify privilege set 150 to now include not just privilege 152, but also privileges 154, 156 that correspond to functionalities 142, 144 of feature 140. The process then returns to block 210. Note that software producer 190 does not modify application 120 to include feature 140 and functionalities 142, 144 because feature 140 and the associated functionalities 142, 144 are already included in application 120 when application 120 was installed in system 110 by software producer 190.

In the second pass through block 210, application 120 receives a new request from end user 174 for which a response involves providing information on available functionalities. For example, end user 174 wants to use the OS deployment feature of application 120, and similar to end user 172, end user 174 selects an "OS Deployment" option from a list of available options using a suitable user interface. The response to the request from end user 174 involves providing information about the functionalities that are available relative to the selected feature, which now includes both functionality 132 of feature 130 and functionalities 142, 144 of feature 140.

As before, feature 130 corresponds to the OS deployment feature, whereas feature 140 corresponds to a power management feature that includes a "power on" function (e.g., functionality 142) and a "power off" function (e.g., functionality 144) that can be used in conjunction with the OS deployment function of functionality 132. While feature 140 for power management can be used by end user 174 in a stand-alone fashion independent of any other features, in this example, the power management feature can also be used by end user 174 when using the OS deployment feature so that end user 174 can perform the power management functions during OS deployment. Because the power management feature was included during development of application 120 prior to installation at the customer location, both the OS deployment feature and the power management feature are capable of interacting with each other or of being used independent of each other. As a result, the two features appear to end user 174 to be tightly integrated with a consistent look and feel via the applicable user interface.

In the second pass through block 220, in response to the second request, application 120 accesses the data that describes the modified set of indicators that correspond to the set of functionalities. For example, functionality manager 160 of application 120 accesses privilege set 150 that now includes privileges 152, 154, 156 that correspond to functionalities 132, 142, 144, respectively.

In the second pass through block 230, based on the modified set of indicators describing the particular indicators, application 120 determines that one or more functionalities are to be associated with the response to the request. For example, functionality manager 160 determines that, because privilege set 150 including privileges 152, 154, 156, the three particular functionalities, namely functionalities 132, 142, 144, are to be associated with the response to the second request from end user 174.

Unlike before during the first pass through block 230 when privilege set 150 only included privilege 152, here the modified privilege set 150 includes two additional privileges 152, 154 for which the corresponding functionalities 142, 144 are to be associated with the response to the second request from end user 174. To end user 174, application 120 appears to have been updated to include the new power management feature due to the inclusion of functionalities 142, 144, although the extent of the update to application 120 is merely the modification of privilege set 150 to include privileges 152, 154, which need not require any downtime of application 120.

In the second pass through block 240, application 120 sends a second response so that the information regarding the one or more particular functionalities can be displayed via a user interface. For example, application 120 sends a second response to end user 172 with information that allows end user 174 to select either the OS deployment functionality that corresponds to functionality 132, such as by presenting a button object in a browser-based user interface, or the power management feature that corresponds to functionalities 142, 144, such as by presenting a tab with two buttons in a browser-based user interface with one button corresponding to the "power on" functionality (e.g., functionality 142) and another button corresponding to the "power off" functionality (e.g., functionality 144). Because application 120 was developed prior to installation at the customer to include both the OS deployment feature and the power management feature, each can be configured to work with the other, such as by specifying which widgets or other features of the user interface should appear. As a result, end user 174 is provided with a consistent look and feel with the ability to use the different features together instead of having to use each feature separately from the other features.

One way to conceptualize the use of privileges to manage functionalities is to consider all functionalities for which privileges have not been created and therefore are not available for use as being "hidden." Those functionalities are part of the application, but due to the lack of the corresponding privileges being included in the set of privileges, the functionalities are hidden from the end user. Therefore, the application appears to lack the functionalities associated with the missing privileges. Then when privileges are added to the set of privileges, the corresponding functionalities are apparent to the user and no longer hidden, and it appears to the end user that the application has been significantly altered to include the new features when in fact the new features were present since the last installation of the application and merely hidden from the end user.

Thus, the use of privileges can be described as the "logical masking" (e.g., certain privileges are not included in the set of privileges) and "logical unmasking" (e.g., certain privileges are now included in the set of privileges) of the corresponding functionalities. From the end user's perspective and experience in working with the application, when the functionalities are masked, the application appears to lack the ability to perform the masked functionalities, even though that is not the case and the only thing preventing the use of those functionalities is the lack of the corresponding privileges in the set of privileges. When the privileges are then added to the set of privileges, it appears to the end user that the application has been modified, and perhaps even appear to be a significant modification or upgrade if the functionalities corresponding to the added privileges interact with a significant number of other features, when in fact the only change to the application is the incorporation of the new privileges in the set of privileges.

2.0 Associating Privileges with Functionalities 2.1 Establishing a Set of Privileges for an Application An application, a set of applications, or a portion of an application can be designed to work with one or more sets of privileges that are used to determine which functionalities are available for use by end users. For example, a file can be established that delineates for each privilege one or more privilege attributes. Examples of privilege attributes may include one or more of the following: a privilege name that identifies and distinguishes the privilege from other privileges, a resource name that identifies the type of resource to which the privilege applies, a functionality that identifies the function or action for the privilege, and a feature name that identifies which feature the functionality belongs to (e.g., a feature can include one or more functionalities). In other implementations, the data that describes a set of privileges can include any suitable arrangement of information.

In yet other implementations, multiple privilege sets can be used, such as by grouping certain types of privileges together in separate sets of privileges or by having different levels of privileges, such as a software producer privilege set level that only the software producer uses and another privilege set level for the customer to use. In generally, the approaches described herein for associating privileges with functionalities to manage the use of the functionalities can be implemented in any manner depending on the requirements of the particular installation, the customers' needs, and the level of control over the application or system that the software producer wishes to retain versus the level of control the software producer is willing to provide to the customer.

As a specific example, Table 1 illustrates a simple privilege set that is comprised of a text file with five columns corresponding to the privilege attributes described above. Table 1 describes the privileges for three features: the Application Deployment feature that includes the deploy application functionality, the Core feature that includes the firmware deployment, the OS deployment, and update deployment functionalities, and the Power Management feature that includes power on, power off, and power cycle functionalities.

TABLE 1

| Privilege Name | Resource | Functionality | Feature |
| --- | --- | --- | --- |
| ServerDeployApplication | server | deployapplication | Application Deployment |
| ServerDeployFirmware | server | deployfirmware | Core |
| ServerDeployOS | server | deployos | Core |
| ServerDeployUpdate | server | deployupdate | Core |
| PowerOn | server | poweron | Power |
| PowerOff | server | poweroff | Power |
| PowerCycle | server | powercycle | Power |

In the example privilege set illustrated in Table 1, there are seven privileges corresponding to three different features. Each of the example privileges is associated with the same "server" resource, although in other implementations, other resources can be used such as applications, firmware, group, job, OS, role, storage, switch, update, and user.

A set of privileges and the use of the set of privileges can be established in a secure fashion, such as by encrypting the data that describes the set of privileges and using encrypted communications to access, modify, and configure the set of privileges.

2.2 Mapping Privileges to Functionalities

A privilege set associates privileges with functionalities. In one embodiment, each functionality is mapped to a privilege and vice versa, so that there is a one to one correspondence between functionalities and privileges. As a result, individual functionalities can be made available separate from any other functionalities. For example, in Table 1, the power off functionality can be made available using the PowerOff privilege, regardless of whether or not the power on and power cycle functionalities are made available.

In another embodiment, two or more functionalities are mapped to a privilege, and therefore the granting or revoking of that privilege makes the two or more functionalities available or not available for use together. For example, in Table 1, instead of having separate privileges for power on, power off, and power cycle, a single power privilege can be used and mapped to each of the three different functionalities, so that either all three power management functionalities are made available together or none of the three power management functionalities are made available.

In yet another embodiment, a feature is mapped to a privilege, and the granting of that privilege makes the one or more functionalities comprising the feature available for use. Generally, multiple privileges are not used that correspond to the same functionality, although that is not necessarily precluded in the approaches described herein. However, a particular feature may include multiple functionalities that each correspond to a privilege, and therefore a single feature can be associated with multiple privileges.

2.3 Working with a Set of Privileges

The use of a set of privileges involves several types of functions or operations, including but not limited to, the following: reading a set of privileges, adding privileges to the set of privileges, deleting privileges from a set of privileges, and configuring privileges in a set of privileges. Each operation relating to the set of privileges can itself be managed through a privilege and the corresponding functionality (e.g., a read privilege that corresponds to the functionality to view the contents of the set of privileges).

The ability to read a set of privileges is typically allowed for both the software producer 190 and the customer, typically to administrator 180 at the customer location, but generally not to end users 174, 174. The functionalities of adding and deleting privileges are typically allowed for only software producer 190, who often uses the privileges to permit or deny the customer the ability to use particular features and functionalities. However, the privilege set can be established to allow a customer to make some changes to the set of privileges, or to at least make some specified changes (e.g., adding or deleting some privileges but not others).

Furthermore, configuring privileges is typically allowed for both software producer 190 and the customer 170, although generally the customer handles making the desired configurations (see the section below that describes configuring a privilege set in more detail). In some implementations, one or more functions relating to working with a privilege set are associated with an access control mechanism, such as a key or special user type or user role, and the key or user type or user role can be used by any of the entities depicted in FIG. 1.

To implement a feature or functionality, the corresponding entry to the privilege set is added. For example, a privilege set that includes only the Core privileges but not the Power Management privileges given in Table 1, can be modified to add three additional rows for the three power management functionalities. As another example, only one of the power management functionalities can be added to the privilege set if only one power management functionality is desired.

To remove a feature or functionality, the corresponding entries to the privilege set are deleted. For example, in Table 1, the ServerDeployFirmware privilege can be removed, so that subsequent users of the system no longer see any information relating to Server Firmware Deployment.

The modification of a set of privileges is typically performed by the creator of the software, such as software provider 190 of FIG. 1. For example, the file that lists the privilege set can be configured so that the customer cannot add or delete rows or entries, even if an administrator, such as administrator 180, attempts to do so. This approach allows software producer 190 to control which functionalities and features of application 120 are made available to the customer.

If the customer wants to have some features or functionalities made available, software producer 190 can make the corresponding changes to privilege set 150 without the need to modify any other portions of application 120. Conversely, if the software producer 190 wants to remove features or functionalities, such as the phasing out of a previous feature that is being replaced by a more advanced feature, software producer 190 can remove the corresponding privilege(s) from privilege set 150. With this approach, application 120 need not be taken down and made unavailable for performing such a feature/functionality upgrade, thereby minimizing the adverse impact of downtime on the customer's business and the risk of failure in bringing back up an application that otherwise would have to be taken down for such an upgrade.

In other implementations, the operations that are typically performed by software producer 190 are performed by others, such as administrator 180, depending on the how the software producer 190 and the customer agree to manage privileges for the system.

Because the set of privileges is part of the installation of an application or system and because the features, modules, and components of the application or system are developed with the set of privileges in mind, manipulation of the set of privileges can be performed without taking the application or system down. Whenever the set of privileges is changed and the modified set of privileges made available for use, subsequent user sessions with the application or system make use of the updated set of privileges. As a result, by using the set of privileges to manage the functionalities, downtime and the associated risk can be avoided when making such updates to the application or system because only the set of privileges needs to be accessed and modified since the remaining portions of the application or system will reflect the changes when using the privileges to determine which functionalities are available for use. Thus, there is no need to install another version of some or all of the application or system.

2.4 Configuring a Set of Privileges

Once a set of privileges is established or modified by software provider 190, the set of privileges can still be setup to allow for configuration by customer 170. For example, after software producer 190 adds the three power management privileges listed in Table 1, administrator 180 at customer 170 can still be given the ability to turn off or turn on the privileges, such as through another column in Table 1 that designates whether each privilege is "active" or "inactive" or by associating one or more roles with each privilege that are used in conjunction with a role based access control feature to determine for which users the associated functionalities are to be made available for use.

As another example, software producer 190 can establish a master set of privileges that lists all the privileges that can be used, and then administrator 180 establishes a working set of privileges that only includes those privileges designated by administrator 180. As a result, administrator 180 can only include in the working set of privileges the privileges listed in the master set of privileges. If administrator 180 attempts to add a privilege to the working set of privileges that is not included in the master set of privileges, application 120 provides administrator 180 with an error message.

2.5 Positive and Negative Privileges

The examples described so far herein are in the form of "positive" privileges such that when a privilege is included in a privilege set, one or more users are permitted to use the corresponding functionality. As more positive privileges that are created and implemented in a set of privileges, the greater the number of features and functionalities that are made available for use.

However, privileges need not always be of the "positive" variety and can include "negative" privileges that prevent a functionality from being made available for use. For example, an application can include a core set of functionalities that are not associated with any privileges, and as a result, the core functionalities are, by default, available for use by any end user. However, if the privilege set is modified to include a negative privilege, then the particular functionality in the set of core functionalities that corresponds to the negative privilege is no longer available for use.

The use of negative privileges can be desirable when there is a set of functionalities that are almost always made available for use, except for special situations. Thus, the set of privileges need not include a positive privilege corresponding to each of the core features or functionalities, thereby reducing the number of privileges to be used and managed and reducing processing time when the core features and functionalities are accessed. When a special situation arises necessitating the denial to one or more users to be able to use a particular functionality, the corresponding negative privilege can be added to the set of privileges and a check made when using each core feature or functionality to determine if such a negative privilege exists.

3.0 Using Privileges to Manage Functionalities

3.1 Associating Privileges with Application Responses

Typically an application includes many features, often implemented through various modules, and many of the features are designed to work with some, but usually not all, of the other features of the application. While a set of privileges can be used to determine which functionalities are available for use either as standalone features or in conjunction with other features, each feature or module can include a list of privileges that are associated with the particular feature or module so that only the functionalities corresponding to the privileges in the list are available for use through that particular module.

For example, with the OS deployment feature described above, the application developer would likely want the OS deployment functionality to work with the three power management functionalities, but the developer would probably want the power management feature, when accessed directly, to not include the OS deployment feature. Therefore, part of the OS deployment module can include a list of the associated privileges that includes not only the OS deployment privilege but also the three power management privileges. However, the power management module would include a list of only the three power management privileges without the OS deployment privilege. As a result of each module or feature including a listing of the associated privileges, when a user accesses the OS deployment module, the user can access the OS deployment functionality and the three power management functionalities, but when the user accesses the power management module, the user can only access the power management functionalities.

3.2 Accessing a Set of Privileges

As illustrated in FIG. 1 and described with respect to FIG. 2, privilege set 150 is part of application 120 and functionality manager 160, which is also part of application 120, accesses privilege set 150 to determine which functionalities are available for use. However, in other implementations, a privilege set can be implemented in any suitable data structure within or without an application. In addition, other implementations can incorporate the functions of functionality manager 160 as a stand-alone application or as part of another type of application, such as an access control application or an access control module that is part of a larger application.

3.3 Determining which Functionalities to Associate with a Response

When an application receives a request, the application determines which functionalities are to be associated with a response to the request based on the set of privileges. For example, a first step can be to access the appropriate list of privileges for the feature or module being used to determine which privileges are associated with that feature or module. Since many applications include dozens or hundreds of features and modules, generally not all the functionalities are designed to be capable of being used in conjunction with all other features and modules. Thus, as described above, each feature or module of an application can include a list of those privileges that can be used with that particular feature or module. The list can include all privileges that can potentially be used with that module, and the inclusion of the privileges on that module's list is independent of whether or not the listed privileges have been added by the software producer to the set of privileges for the application.

Once the list of privileges for the desired feature or module is known, that module list of privileges can be compared to the application's set of privileges to determine which privileges on the module list are in the application's privilege set. Only those privileges that are on both the module list of privileges and included in the application's set of privileges are determined to be associated with the response. In other implementations, the application's set of privileges can be accessed first and then compared to the module list of privileges to determine which privileges are included in both.

The comparison of the list of privileges associated with the module, as indicated in the module list of privileges, with the application's set of privileges can be performed in any of a number of ways. For example, the module can access the set of privileges to see which of the privileges on the module's list of privileges are included in the set of privileges. As another example, the module can provide the module's list of privileges to functionality manager 160 and receive in return a modified list of privileges that only includes those privileges in the set of privileges.

Regardless of how the comparison is performed, the end result is that based on the set of privileges and the list of privileges associated with a module, a set of applicable privileges for generating a response is identified from which the corresponding functionalities are identified from the set of privileges to determine which functionalities are to be associated with a response.

When working with a privilege set to determine which functionalities are available, one of a number of approaches can be used to determine the particular state of the set of privileges. For example, the set of privileges can be set at the start of an end user's session when working with a system or application, and as part of initiating that end user session, a copy of the set of privileges existing at the start of the session is made and used during that end user session to determine which functionalities are available. As a result, if the set of privileges is modified during the time that the end user's session is active, any changes to the set of privileges will not affect which functionalities that the end user can use during that end user session. But if the end user terminates that session and starts a new session, the modified set of privileges is used, and as a result, the user may see more or fewer functionalities in the subsequent session depending on what changes were made to the set of privileges.

As another example, the set of privileges can be set when the end user accesses a particular module or component of an application. As yet other examples, the set of privileges can be set whenever a response to a request originating from an end user is received or the set of privileges can be set at the start of each work day or work week so that any changes do not take effect until the next work day or work week. In generally, any suitable approach for a particular situation can be used to set or "freeze" a set of privileges for subsequent use in determining which functionalities are available.

3.4 Generating and Sending a Response

After using the privileges to determine which functionalities are to be associated with a response, the application generates the response and sends the response. For example, if the application determines that the response to the end user is to include information about both the OS deployment functionality and the three power management functionalities, then the application can generate a response suitable for the end user's user interface that includes commands, buttons, drag items, drop targets, widgets, or whatever suitable interface mechanism to convey to the user the functionalities that the user is permitted to use. Once the application has generated the response, the application can send the response to the end user over the appropriate communications link.

3.5 Displaying Responses Via User Interfaces

The response from the application to the user's request is displayed to the user through a suitable user interface. For example, if the user is interacting with the application through a command line interface (CLI), the response can be displayed to the user through a list of commands that the user is allowed to use, such as a "Deploy OS" command to deploy OS to one or more servers, a "Power On" command to turn the power on to a server, a "Power Off" command to turn the power off to a server, and a "Power Cycle" command to cycle the power state of a server from a first state to a second state and then back to a first state (e.g., from "on" to "off" to "on" and vice versa). Then in response to the user selecting one of the presented commands, the application performs the chosen functionality. If additional information is required prior to performing the selected function, the application can query the user to obtain the necessary information (e.g., by displaying a question asking the user to identify which server is to be power cycled).

As another example, if the user is interacting with the application through a browser-based interface, the response can be displayed to the user through a set of appropriate graphical user interface mechanisms, such as buttons, tabs, check boxes, drag items, drop targets, or other widgets that the user can select such as by using a graphical pointing device like a mouse.

Regardless of the particular type of user interface being used, the information displayed to the user that identifies the available functionalities is based on the functionalities that are determined through the use of the set of privileges for the system.

4.0 Functionality States and State Transitions

4.1 States of Functionalities

For each functionality of a system, there is an associated state that represents the status of the associated functionality. For example, in some implementations, the states INSTALLED, AVAILABLE, and UNAVAILABLE are used. The state INSTALLED means that the functionality is included in the current installation of the system software but has not yet been made available for use. The state AVAILABLE means that the functionality is both installed in the current installation and is available for use by the associated modules and by authorized users. The state UNAVAILABLE means that the functionality is installed in the current installation and was previously available for use but has since been made unavailable.

In other implementations, other state designations can be used. For example, instead of INSTALLED, AVAILABLE, and UNAVAILABLE, the states INSTALLED, GRANTED, and REVOKED can be used. As another example, the states IMPLEMENTED, ENABLED, and DISABLED can be used, and the approach for managing functionalities can be referred to as functionality/feature enablement/disablement. As yet another example, the states INCLUDED, ENTITLED, and NOT ENTITLED can be used, and the approach for managing functionalities can be referred to as functionality/feature entitlement. In general, any suitable nomenclature for the different possible states for a given functionality can be used, and a particular implementation may use fewer or more states than the three states in the above examples.

In addition, in other implementations, states are applied not at the functionality level, but at the feature level, so that each feature is INSTALLED, AVAILABLE, or UNAVAILABLE and the functionality or functionalities for each feature have the same state as the feature. In yet other implementations, the states can be implemented on other appropriate logical levels besides the functionality or feature levels, such as at a module, component, or application level.

4.2 Transitioning from One Functionality State to Another

To describe the transitions between functionality states, the states INSTALLED, GRANTED, and REVOKED are used, although other state designations can be used in a particular implementation.

Figure 3:
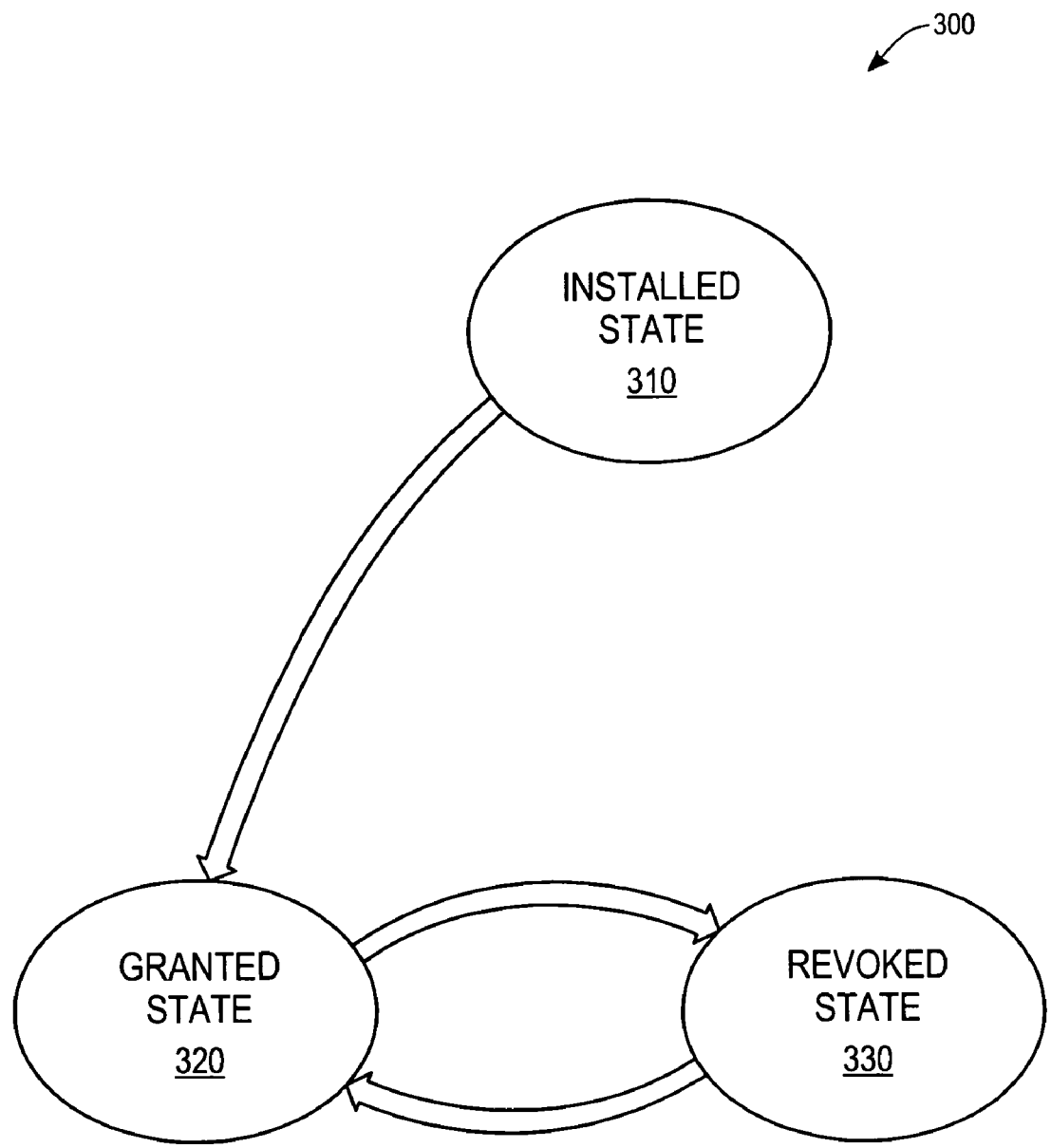
FIG. 3 is a block diagram that illustrates the states and state transitions for a functionality, according to an embodiment.

FIG. 3 is a block diagram 300 that illustrates the states and state transitions for a functionality, according to an embodiment. In FIG. 3, there are three possible states: INSTALLED STATE 310, GRANTED STATE 320, and REVOKED STATE 330. The direction of the arrows between each pair of states indicates which state transitions can occur in this example.

When an application is initially installed, the state of a particular functionality is represented by INSTALLED STATE 310. From INSTALLED STATE 310, the state can change to GRANTED STATE 320, such as through the addition to the set of privileges of the particular privilege that corresponds to the desired functionality.

After a functionality is made available, as indicated by GRANTED STATE 320, the state can be changed to REVOKED STATE 330, such as through the removal from the set of privileges of the particular privilege that corresponds to the desired functionality.

After a functionality is made unavailable, as indicated by REVOKED STATE 330, the state can be changed to GRANTED STATE 320, such as through adding back in to the set of privileges the particular privilege that corresponds to the desired functionality.

5.0 Tightly Integrated Software Applications

Upgrades to software applications commonly enhance or add features and functionalities that can be used both standalone and in conjunction with other features and functionalities. Due to the complexity of many applications, some upgrades are limited in the degree to which new or enhanced features are integrated to work with other features. While this "limited upgrade" approach reduces the complexity of the upgrade, from a user perspective, the lack of full integration of the new features limits the usefulness of the new features and results in a reduction of the user's perceived value of the upgrade.

In some embodiments, more complete upgrades are used that more fully implement new or enhanced features to work with other features and incremental upgrades that limit the integration of the new or improved features are reduced or sometimes avoided altogether.

5.1 "Forklift" Upgrades

A "forklift" upgrade is an upgrade in which new or enhanced features are integrated into the development of a new version of the application so that the new or enhanced features can be used both on their own in a standalone fashion as well as used in conjunction with other features, thereby providing a more seamless application appearance to a user. For example, if the power management feature described previously was to be implemented through a forklift upgrade to an existing version of an application, the software producer would undergo a significant development effort to create a new version of the application that both adds the power management functionalities to the application and ensures that any other features that would be desirable to incorporate the power management functionalities, such as the OS deployment feature, are also modified to be able to work in conjunction with the power management functionalities. By tightly integrating features and functionalities through the development, test, and distribution process, higher degrees of integration are possible across the different portions of the application or system.

As a specific example, a user of the new version of the application that adds the power management feature would be able to access from a set of menus or other similar user interface construct the power management feature that includes the three functionalities of "power on," "power off," and "power cycle." In addition, if the user were to use the OS deployment feature of the application, the interface for OS deployment would include new options and/or commands to directly access one or more of the power management functionalities. Other features, either those included in the previous version or those added or enhanced in the new version of the application, could be modified to also work with the power management feature.

As a result, the user would be able to use the power management feature either as a standalone module of the application or in conjunction with one or more other features of the application. To the user, the power management feature would appear and work as if the power management feature had been incorporated into the original version of the application. While the software producer would incur additional effort to create a more extensive upgrade to the application, the end result would be a more fully integrated set of features and an improved user experience, which would also increase the perceived value of the upgrade to the customer.

In some implementations, the forklift upgrade is a full revision of the application such that the previously installed version at a customer location is replaced by the modified version. In other implementations, the forklift upgrade revises certain portions of the application (e.g., only those portions of the application that were modified to take into account the new or improved features, including previous features that have been modified to work with the new or improved features), which are replaced by new versions of those portions of the application.

While a forklift upgrade will likely add or improve many features for an application, individual customers may not wish to purchase or use all of the added or improved features. In this situation, the application can incorporate the use the privilege approach described above to allow the software producer to make individual functionalities available or not available following installation of the forklift upgrade. For example, if the forklift upgrade adds the power management feature that the software producer wants to charge customers for separate from the existing application features, the new version of the application that is installed at a particular customer can leave the power management features unavailable for use by the customer's users (e.g., the state of the power management functionalities is left as INSTALLED because the power management privileges are not added to the set of privileges.)

If and when the particular customer thereafter desires to purchase the power management feature, the software producer can add the privileges for one or more of the power management functionalities to the set of privileges for the application (e.g., changing the state of those functionalities from INSTALLED to GRANTED by adding privileges to the set of privileges) upon appropriate payment by the customer. Similarly, if the customer originally purchased the right to use the power management feature when the forklift upgrade was installed, but later the customer decides that they no longer want to pay for that feature, the software producer can remove the privileges for the power management functionalities from the set of privileges (e.g., changing the state of those functionalities from GRANTED to REVOKED by removing privileges from the set of privileges).

5.2 Minimizing or Avoiding Incremental Upgrades

In order to improve the customer experience when using new or improved features, incremental upgrades can be minimized or avoided altogether in favor of the use of more complete application revisions, such as the forklift upgrades. For example, instead of making more frequent and less extensive upgrades to an application such as quarterly revisions, application modifications to incorporate changes to the application's features can be batched together and incorporated into less frequent but more extensive forklift upgrades during which many or even all of the components of the application are replaced with new versions of those components.

The use of the forklift upgrade approach, in lieu of the more common approach of using incremental upgrades, along with the set of privileges to manage functionalities by making individual functionalities and features available or not available for use provides the user with an improved user experience and increased perception of the value of the upgrades while allowing the software producer the ability to control which features and functionalities are made available for use without the need to incur the downtime or risk associated with the typical incremental upgrade.

6.0 Using Privileges with Other Application Features

The approach described herein for using privileges, or more generally indicators of functionality availability, can be used with other types of application features, including but not limited to, role based access control and dynamic content generation.

6.1 Role Based Access Control

Role based access control is used to determine whether a user is permitted access to use an application, work with files, access system resources, or perform functions or take actions within the system. For example, many systems have different levels of access for different types of users, such as workers, managers, and information technology administrators, and typically each time a user accesses the system, a unique user identifier and password is used to authenticate the user to the system and to determine what degree of access to the system's resources the user has been permitted. Often a set of data, such as a group of permissions for specified users, groups, or sessions, is used to delineate which users, groups, or sessions are permitted to access which resources of the system or application.

An application that employs a set of privileges for determining the availability of functionalities can also employ role based access control to further manage and control how users interact with the application. For example, a set of privileges that are modified by a software producer and configured by an administrator at a customer location can be used to determine which application features and functionalities are available, and then a role based access control approach can be applied to determine whether a particular user is allowed to access an available functionality. If the role based access control feature determines that a particular user is allowed to access a specified functionality, then the functionality is made available for use by that user. However, if the role based access control feature determines that a particular user is not allowed to access a specified functionality, then the functionality is not made available for use by that user.

In some implementations, the role based access control feature of an application or system is modified to include security privileges that are designed to be used as the indicators of functionality availability described above. In such an approach, the role based access control feature performs not only the typical access control function, but also the function of determining which functionalities are available for use and which functionalities are not available for use.

The determination of whether or not a functionality is available or not based on security privileges is different than determining whether a particular user or a particular user session is permitted access to the resources of an application or system based on the same type of security privileges. While both determinations incorporate the use of the same logical construct of a "security privilege," the two uses of the security privileges are quite different.

For example, if an installed application includes a power management feature that has not been made available by the software producer, even a "root user" at the customer who has the most expansive security access cannot use the power management functionalities. After the software producer adds the security privileges corresponding to the power management feature to the set of privileges, then the root user can access the power management functionalities and configure the associated power management privileges to permit the power management functionalities to be available for use by the customer's end users. Even after the power management functionalities are made available for use, the administrator can use the role based access control feature to determine which particular users are permitted to access the power management functionalities. Thus, functionality availability is a separate consideration than functionality access, although both may be determined by an application through the use of security privileges as part of a role base access control feature.

6.2 Dynamic Content Generation

Dynamic content generation refers to the inclusion of information in a response that can potentially change over time, such as a current time, a weather forecast, or a stock price. The particular content returned in response to a request is determined at a time associated with the request so that responses sent at different times will typically not include the same information. Thus, the type of information to be included in a response is previously specified for the response (e.g., the price of a specified stock or the weather at a specified location), but the exact value of that information is determined in response to the request (e.g., the most current stock price at the time the request is received or the current weather at the location from which the request is sent).

An application that incorporates dynamic content generation can also use a set of privileges to dynamically determine which functionalities are available for use. Dynamic content generation is similar to the use of a set of privileges to determine functionality availability to the extent that both the dynamic content and the determination of available functionalities are performed in response to a request. However, dynamic content generation is fundamentally different from dynamically determining functionality availability because with dynamic content generation, the type of content or information has been specified prior to the request, whereas with the dynamic determination of functionality availability and therefore which functions are to be associated with a response are determined at a time associated with the request.

For example, if a user makes the same request in the morning and in the evening, and the response includes the current time, the user will be provided with a response in the morning that has the time when the response to the user's morning request was sent while the user will be provided in the evening with a response provided that has the time of the response to the user's evening request. In either case, the inclusion of the time in the response was previously determined, and the particular time value is dynamically determined in response to the request.

However, assume the application includes a current time functionality for which the corresponding privilege is not included in the set of privileges. Thus, even though the feature or module that the user is using includes the ability to provide a current time, the lack of the current time privilege in the set of privileges precludes the inclusion of the current time in a response to the user. As a result, when the user makes a request in the morning, the response does not include the time when the response to the user's morning request is sent.

Now assume that the software producer adds the current time privilege to the set of privileges in the afternoon of the same day and that the administrator at the customer location configures the current time functionality to be available for use by all users. Then in the evening, the same user makes the same type of request from the same feature or module of the application. Because the set of privileges now includes the current time privilege, the response sent to the user includes the current time.

7.0 Hardware Overview

The approach for managing functionalities described herein may be implemented in a variety of ways and the invention is not limited to any particular implementation. The approach may be integrated into a computing or network system or a device that uses one or more software applications, or may be implemented as a stand-alone mechanism. Furthermore, the approach may be implemented in computer software, hardware, or a combination thereof.

Figure 4:
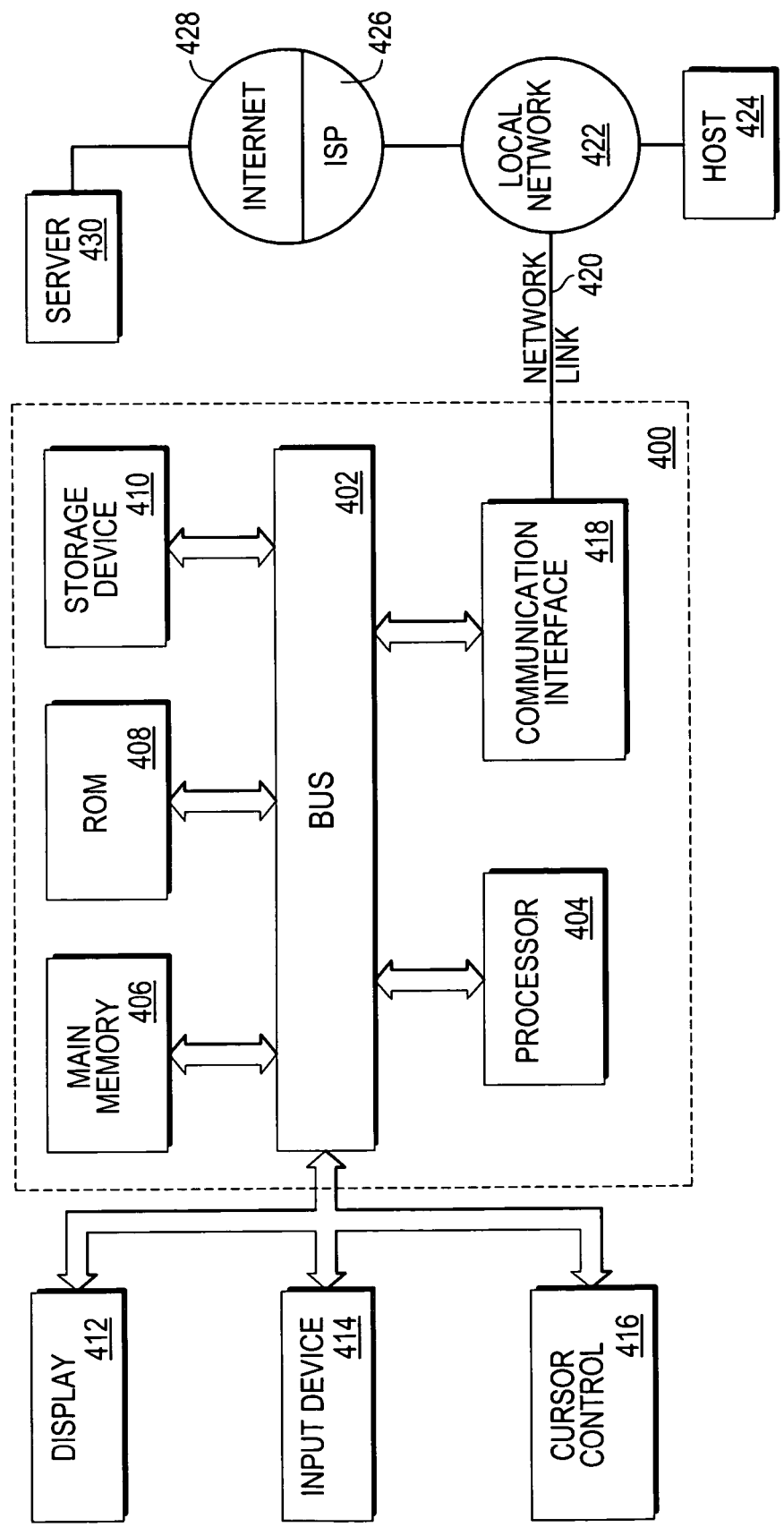
FIG. 4 is a block diagram that depicts a computer system upon which embodiments of the invention may be implemented.

FIG. 4 is a block diagram that depicts a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

8.0 Extensions and Alternatives

In the foregoing description, the invention has been described with reference to specific embodiments thereof. It will, however, be evident that various modifications and changes may be made thereto without departing from the broader spirit and scope of the invention. For example, although examples have illustrated the use of privileges, the privileges are used for explanation purposes only as embodiments of the invention are not limited to any particular type of indicator of functionality availability. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A machine-implemented method for managing a plurality of functionalities in a system, comprising:
   receiving a request for which a response involves providing information regarding functionalities that are available to be used;
   in response to receiving the request,
      accessing data that describes a set of indicators that corresponds to a set of functionalities of the plurality of functionalities, wherein each functionality of the set of functionalities is associated with an indicator in the set of indicators, and wherein each indicator can be used to determine whether the associated functionality is available for use;
      based on said data describing a particular indicator in the set of indicators, determining that one or more particular functionalities of the set of functionalities are to be associated with the response because the particular indicator corresponds to the one or more functionalities; and
      sending the response so that the information regarding the one or more particular functionalities can be displayed via a user interface.

2. The machine-implemented method of claim 1, wherein the request is a first request and the response is a first response, and the method further comprises:
   modifying the data to alter the set of indicators corresponding to the set of functionalities;
   receiving a second request for which a second response involves providing the information regarding functionalities that are available to be used;
   in response to receiving the second request,
      based on said modified data, determining that at least one additional functionality of the set of functionalities is to be associated with the second response in addition to the one or more particular functionalities; and
      sending the second response so that the information regarding the at least one additional functionality and the one or more particular functionalities can be displayed via a user interface.

3. The machine-implemented method of claim 1, wherein the request is a first request, the response is a first response, and the one or more particular functionalities includes at least two particular functionalities, and the method further comprises:
   modifying the data to alter the set of indicators corresponding to the set of functionalities;
   receiving a second request for which a second response involves providing the information regarding functionalities that are available to be used:
   in response to receiving the second request,
      based on said modified data, determining that at least one particular functionality of the set of functionalities is to be included in the second response, wherein the at least one particular functionality includes at least one functionality but omits at least one other functionality from the at least two particular functionalities; and
      sending the second response so that the information regarding the at least one functionality can be displayed via a user interface.

4. The machine-implemented method of claim 1, wherein the data is first data, each indicator is a privilege, and the set of indicators is a set of privileges, and the method further comprises:

in response to receiving the request,
identifying a user session that is associated with the request;
accessing second data that is used to determine whether to permit access the one or more particular functionalities based on the user session;
based on the second data, determining that access to the one or more particular functionalities is permitted for the user session; and
based on determining that access is permitted, sending the response.

5. The machine-implemented method of claim 1, further comprising:

modifying the data to alter the set of indicators corresponding to the set of functionalities by performing an operation selected from the group consisting of (a) creating a new indicator that is not already included in the set of indicators, (b) granting an existing indicator that is included in the set of indicators such that one or more functionalities associated with the existing indicator can be used, and (c) revoking a current indicator that is included in the set of indicators such that one or more functionalities associated with the current indicator can no longer be used.

6. The machine-implemented method of claim 5, wherein:

the new indicator is associated with a first functionality of the plurality of functionalities and is associated with a first state;
creating the new indicator includes changing the first state from INSTALLED to GRANTED;
the existing indicator is associated with a second functionality of the set of functionalities and is associated with a second state;
granting the existing indicator includes changing the second state from REVOKED to GRANTED;
the current indicator is associated with a third functionality of the set of functionalities and is associated with a third state; and
revoking the current indicator includes changing the third state from GRANTED to REVOKED.

7. The machine-implemented method of claim 1, wherein determining that one or more particular functionalities of the set of functionalities are to be associated with the response further comprises:

identifying in the set of indicators the particular indicator that is associated with a particular functionality of the set of functionalities; and
based on the inclusion of the particular indicator in the set of indicators, determining that the particular functionality can be associated with the response to the request.

8. The machine-implemented method of claim 1, wherein the set of indicators is a set of privileges, the particular indicator is a first particular privilege, and the method further comprises:

based on said data not including a second particular privilege that is associated with one or more other functionalities of the plurality of functionalities, determining that the one or more other functionalities are not to be associated with the response; and
after determining that the one or more particular functionalities are to be associated with the response and prior to sending the response, determining that the one or more particular functionalities are permitted to be associated with the response based on role based access control.

9. A machine-implemented method for updating an application that includes a first plurality of functionalities, comprising:

creating a first version of the application that includes the first plurality of functionalities, wherein:
a first functionality and a second functionality are included in the first plurality of functionalities;
the first functionality can be used independent of any other functionalities of the first plurality of functionalities; and
the first functionality can be used in conjunction with the second functionality;
installing the first version of the application for a customer, wherein:
the first version of the application includes a first set of security privileges that are associated with a first set of functionalities of the first plurality of functionalities;
each functionality of the first set of functionalities is associated with a first corresponding security privilege in the first set of security privileges; and
based on the first set of security privileges, the customer is able to use the first set of functionalities that includes the second functionality but not the first functionality;
without changing the first version of the application, modifying the first set of security privileges to include a first new security privilege that is associated with the first functionality such that the customer can thereafter use the first functionality both independently of any other functionality in the first set of functionalities and in conjunction with the second functionality.

10. The machine-implemented method of claim 9, the method further comprising:

creating a second version of the application that includes a second plurality of functionalities that is different than the first plurality of functionalities and wherein:
a third functionality and a fourth functionality are included in the second plurality of functionalities;
the third functionality can be used independent of any other functionalities of the second plurality of functionalities; and
the third functionality can be used in conjunction with the fourth functionality;
replacing the first version of the application with the second version of the application, wherein:
the second version of the application includes a second set of security privileges that are associated with a second set of functionalities of the second plurality of functionalities;
each functionality of the second set of functionalities is associated with a second corresponding security privilege in the second set of security privileges; and
based on the second set of security privileges, the customer is able to use the second set of functionalities that includes the fourth functionality but not the third functionality;
without changing the second version of the application, modifying the second set of security privileges to include a second new security privilege that is associated with the third functionality such that the customer can thereafter use the third functionality both independently of any other functionality in the second set of functionalities and in conjunction with the fourth functionality.

11. A machine-readable storage medium for managing a plurality of functionalities in a system, the machine readable storage medium carrying instructions which, when executed by one or more processors, cause the one or more processors to perform the steps of:

receiving a request for which a response involves providing information regarding functionalities that are available to be used;

in response to receiving the request, accessing data that describes a set of indicators that corresponds to a set of functionalities of the plurality of functionalities, wherein each functionality of the set of functionalities is associated with an indicator in the set of indicators, and wherein each indicator can be used to determine whether the associated functionality is available for use;

based on said data describing a particular indicator in the set of indicators, determining that one or more particular functionalities of the set of functionalities are to be associated with the response because the particular indicator corresponds to the one or more functionalities; and sending the response so that the information regarding the one or more particular functionalities can be displayed via a user interface.

12. The machine-readable storage medium of claim 11, wherein the request is a first request and the response is a first response, and the machine-readable storage medium further comprises instructions which, when executed by one or more processors, cause the one or more processors to perform the steps of:

modifying the data to alter the set of indicators corresponding to the set of functionalities;

receiving a second request for which a second response involves providing the information regarding functionalities that are available to be used;

in response to receiving the second request, based on said modified data, determining that at least one additional functionality of the set of functionalities is to be associated with the second response in addition to the one or more particular functionalities; and sending the second response so that the information regarding the at least one additional functionality and the one or more particular functionalities can be displayed via a user interface.

13. The machine-readable storage medium of claim 11, wherein the request is a first request, the response is a first response, and the one or more particular functionalities includes at least two particular functionalities, and the machine-readable storage medium further comprises instructions which, when executed by one or more processors, cause the one or more processors to perform the steps of:

modifying the data to alter the set of indicators corresponding to the set of functionalities;

receiving a second request for which a second response involves providing the information regarding functionalities that are available to be used;

in response to receiving the second request, based on said modified data, determining that at least one particular functionality of the set of functionalities is to be included in the second response, wherein the at least one particular functionality includes at least one functionality but omits at least one other functionality from the at least two particular functionalities; and sending the second response so that the information regarding the at least one functionality can be displayed via a user interface.

14. The machine-readable storage medium of claim 11, wherein the data is first data, each indicator is a privilege, and the set of indicators is a set of privileges, and the machine-readable storage medium further comprises instructions which, when executed by one or more processors, cause the one or more processors to perform the steps of:

in response to receiving the request, identifying a user session that is associated with the request;

accessing second data that is used to determine whether to permit access the one or more particular functionalities based on the user session;

based on the second data, determining that access to the one or more particular functionalities is permitted for the user session; and based on determining that access is permitted, sending the response.

15. The machine-readable storage medium of claim 11, further comprising instructions which, when executed by one or more processors, cause the one or more processors to perform the step of:

modifying the data to alter the set of indicators corresponding to the set of functionalities by performing an operation selected from the group consisting of (a) creating a new indicator that is not already included in the set of indicators, (b) granting an existing indicator that is included in the set of indicators such that one or more functionalities associated with the existing indicator can be used, and (c) revoking a current indicator that is included in the set of indicators such that one or more functionalities associated with the current indicator can no longer be used.

16. The machine-readable storage medium of claim 15, wherein:

the new indicator is associated with a first functionality of the plurality of functionalities and is associated with a first state;

creating the new indicator includes changing the first state from INSTALLED to GRANTED;

the existing indicator is associated with a second functionality of the set of functionalities and is associated with a second state;

granting the existing indicator includes changing the second state from REVOKED to GRANTED;

the current indicator is associated with a third functionality of the set of functionalities and is associated with a third state; and revoking the current indicator includes changing the third state from GRANTED to REVOKED.

17. The machine-readable storage medium of claim 11, wherein the instructions for determining that one or more particular functionalities of the set of functionalities are to be associated with the response further comprises instructions which, when executed by one or more processors, cause the one or more processors to perform the steps of:

identifying in the set of indicators the particular indicator that is associated with a particular functionality of the set of functionalities; and based on the inclusion of the particular indicator in the set of indicators, determining that the particular functionality can be associated with the response to the request.

18. The machine-readable storage medium of claim 11, wherein the set of indicators is a set of privileges, the particular indicator is a first particular privilege, and the machine-readable storage medium further comprises instructions which, when executed by one or more processors, cause the one or more processors to perform the steps of:

based on said data not including a second particular privilege that is associated with one or more other functionalities of the plurality of functionalities, determining that the one or more other functionalities are not to be associated with the response; and after determining that the one or more particular functionalities are to be associated with the response and prior to sending the response, determining that the one or more particular functionalities are permitted to be associated with the response based on role based access control.

19. A machine-readable storage medium for updating an application that includes a first plurality of functionalities, the machine readable storage medium carrying instructions which, when executed by one or more processors, cause the one or more processors to perform the steps of:

creating a first version of the application that includes the first plurality of functionalities, wherein:

a first functionality and a second functionality are included in the first plurality of functionalities;

the first functionality can be used independent of any other functionalities of the first plurality of functionalities; and the first functionality can be used in conjunction with the second functionality;

installing the first version of the application for a customer, wherein:

the first version of the application includes a first set of security privileges that are associated with a first set of functionalities of the first plurality of functionalities;

each functionality of the first set of functionalities is associated with a first corresponding security privilege in the first set of security privileges; and based on the first set of security privileges, the customer is able to use the first set of functionalities that includes the second functionality but not the first functionality;

without changing the first version of the application, modifying the first set of security privileges to include a first new security privilege that is associated with the first functionality such that the customer can thereafter use the first functionality both independently of any other functionality in the first set of functionalities and in conjunction with the second functionality.

20. The machine-readable storage medium of claim 19, the machine-readable storage medium further comprising instructions which, when executed by one or more processors, cause the one or more processors to perform the steps of:

creating a second version of the application that includes a second plurality of functionalities that is different than the first plurality of functionalities and wherein:

a third functionality and a fourth functionality are included in the second plurality of functionalities;

the third functionality can be used independent of any other functionalities of the second plurality of functionalities; and the third functionality can be used in conjunction with the fourth functionality;

replacing the first version of the application with the second version of the application, wherein:

the second version of the application includes a second set of security privileges that are associated with a second set of functionalities of the second plurality of functionalities;

each functionality of the second set of functionalities is associated with a second corresponding security privilege in the second set of security privileges; and based on the second set of security privileges, the customer is able to use the second set of functionalities that includes the fourth functionality but not the third functionality;

without changing the second version of the application, modifying the second set of security privileges to include a second new security privilege that is associated with the third functionality such that the customer can thereafter use the third functionality both independently of any other functionality in the second set of functionalities and in conjunction with the fourth functionality.

21. A mechanism for managing a plurality of functionalities in a system, the mechanism comprising a memory and one or more processors, wherein the memory stores instructions which, when executed by the one or more processors, cause the one or more processors to perform the steps of:

receiving a request for which a response involves providing information regarding functionalities that are available to be used;

in response to receiving the request, accessing data that describes a set of indicators that corresponds to a set of functionalities of the plurality of functionalities, wherein each functionality of the set of functionalities is associated with an indicator in the set of indicators, and wherein each indicator can be used to determine whether the associated functionality is available for use;

based on said data describing a particular indicator in the set of indicators, determining that one or more particular functionalities of the set of functionalities are to be associated with the response because the particular indicator corresponds to the one or more functionalities; and sending the response so that the information regarding the one or more particular functionalities can be displayed via a user interface.

22. The mechanism of claim 21, wherein the request is a first request and the response is a first response, and wherein the memory further stores instructions which, when executed by the one or more processors, cause the one or more processors to perform the steps of:

modifying the data to alter the set of indicators corresponding to the set of functionalities;

receiving a second request for which a second response involves providing the information regarding functionalities that are available to be used;

in response to receiving the second request, based on said modified data, determining that at least one additional functionality of the set of functionalities is to be associated with the second response in addition to the one or more particular functionalities; and sending the second response so that the information regarding the at least one additional functionality and the one or more particular functionalities can be displayed via a user interface.

23. The mechanism of claim 21, wherein the request is a first request, the response is a first response, and the one or more particular functionalities includes at least two particular functionalities, and wherein the memory further stores instructions which, when executed by the one or more processors, cause the one or more processors to perform the steps of:

modifying the data to alter the set of indicators corresponding to the set of functionalities;

receiving a second request for which a second response involves providing the information regarding functionalities that are available to be used:

in response to receiving the second request, based on said modified data, determining that at least one particular functionality of the set of functionalities is to be included in the second response, wherein the at least one particular functionality includes at least one functionality but omits at least one other functionality from the at least two particular functionalities; and sending the second response so that the information regarding the at least one functionality can be displayed via a user interface.

24. The mechanism of claim 21, wherein the data is first data, each indicator is a privilege, and the set of indicators is a set of privileges, and wherein the memory further stores instructions which, when executed by the one or more processors, cause the one or more processors to perform the steps of:

in response to receiving the request, identifying a user session that is associated with the request;

accessing second data that is used to determine whether to permit access the one or more particular functionalities based on the user session;

based on the second data, determining that access to the one or more particular functionalities is permitted for the user session; and based on determining that access is permitted, sending the response.

25. The mechanism of claim 21, wherein the memory further stores instructions which, when executed by the one or more processors, cause the one or more processors to perform the steps of:

modifying the data to alter the set of indicators corresponding to the set of functionalities by performing an operation selected from the group consisting of (a) creating a new indicator that is not already included in the set of indicators, (b) granting an existing indicator that is included in the set of indicators such that one or more functionalities associated with the existing indicator can be used, and (c) revoking a current indicator that is included in the set of indicators such that one or more functionalities associated with the current indicator can no longer be used.

26. The mechanism of claim 25, wherein:

the new indicator is associated with a first functionality of the plurality of functionalities and is associated with a first state;

creating the new indicator includes changing the first state from INSTALLED to GRANTED;

the existing indicator is associated with a second functionality of the set of functionalities and is associated with a second state;

granting the existing indicator includes changing the second state from REVOKED to GRANTED;

the current indicator is associated with a third functionality of the set of functionalities and is associated with a third state; and revoking the current indicator includes changing the third state from GRANTED to REVOKED.

27. The mechanism of claim 21, wherein the instructions for determining that one or more particular functionalities of the set of functionalities are to be associated with the response further comprises instructions which, when executed by the one or more processors, cause the one or more processors to perform the steps of:

identifying in the set of indicators the particular indicator that is associated with a particular functionality of the set of functionalities; and based on the inclusion of the particular indicator in the set of indicators, determining that the particular functionality can be associated with the response to the request.

28. The mechanism of claim 21, wherein the set of indicators is a set of privileges, the particular indicator is a first particular privilege, and wherein the memory further stores instructions which, when executed by the one or more processors, cause the one or more processors to perform the steps of:

based on said data not including a second particular privilege that is associated with one or more other functionalities of the plurality of functionalities, determining that the one or more other functionalities are not to be associated with the response; and after determining that the one or more particular functionalities are to be associated with the response and prior to sending the response, determining that the one or more particular functionalities are permitted to be associated with the response based on role based access control.

29. A mechanism for updating an application that includes a first plurality of functionalities, the mechanism comprising a memory and one or more processors, wherein the memory stores instructions which, when executed by the one or more processors, cause the one or more processors to perform the steps of:

creating a first version of the application that includes the first plurality of functionalities, wherein:

a first functionality and a second functionality are included in the first plurality of functionalities;

the first functionality can be used independent of any other functionalities of the first plurality of functionalities; and the first functionality can be used in conjunction with the second functionality;

installing the first version of the application for a customer, wherein:

the first version of the application includes a first set of security privileges that are associated with a first set of functionalities of the first plurality of functionalities;

each functionality of the first set of functionalities is associated with a first corresponding security privilege in the first set of security privileges; and based on the first set of security privileges, the customer is able to use the first set of functionalities that includes the second functionality but not the first functionality;

without changing the first version of the application, modifying the first set of security privileges to include a first new security privilege that is associated with the first functionality such that the customer can thereafter use the first functionality both independently of any other functionality in the first set of functionalities and in conjunction with the second functionality.

30. The mechanism of claim 29, wherein the memory further stores instructions which, when executed by the one or more processors, cause the one or more processors to perform the steps of:

creating a second version of the application that includes a second plurality of functionalities that is different than the first plurality of functionalities and wherein:

a third functionality and a fourth functionality are included in the second plurality of functionalities;

the third functionality can be used independent of any other functionalities of the second plurality of functionalities; and the third functionality can be used in conjunction with the fourth functionality;

replacing the first version of the application with the second version of the application, wherein:

the second version of the application includes a second set of security privileges that are associated with a second set of functionalities of the second plurality of functionalities;

each functionality of the second set of functionalities is associated with a second corresponding security privilege in the second set of security privileges; and based on the second set of security privileges, the customer is able to use the second set of functionalities that includes the fourth functionality but not the third functionality;

without changing the second version of the application, modifying the second set of security privileges to include a second new security privilege that is associated with the third functionality such that the customer can thereafter use the third functionality both independently of any other functionality in the second set of functionalities and in conjunction with the fourth functionality.

* * * * *